United States Patent
Jackson et al.

(10) Patent No.: US 7,354,097 B2
(45) Date of Patent: Apr. 8, 2008

(54) POWER-ACTUATED CLOSURE SYSTEM

(75) Inventors: Craig A. Jackson, Sterling Heights, MI (US); Jonathan H. Owen, Beverly Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 199 days.

(21) Appl. No.: 11/137,023

(22) Filed: May 25, 2005

(65) Prior Publication Data

US 2006/0267374 A1 Nov. 30, 2006

(51) Int. Cl.
*B60J 5/06* (2006.01)
*B60J 5/00* (2006.01)

(52) U.S. Cl. ............... 296/146.1; 296/155; 49/26; 15/250.1

(58) Field of Classification Search .......... 296/146.1, 296/146.8, 146.4, 155; 49/25–28; 15/256.5, 15/250.1
See application file for complete search history.

(56) References Cited

U.S. PATENT DOCUMENTS

| | | | | |
|---|---|---|---|---|
| 5,140,316 A | * | 8/1992 | DeLand et al. | 340/825.69 |
| 5,963,000 A | * | 10/1999 | Tsutsumi et al. | 318/480 |
| 6,548,979 B2 | * | 4/2003 | Boisvert et al. | 318/469 |
| 6,744,365 B2 | * | 6/2004 | Sicuranza | 340/556 |
| 6,836,209 B2 | * | 12/2004 | Ploucha | 340/435 |

* cited by examiner

*Primary Examiner*—Dennis H Pedder
*Assistant Examiner*—Melissa Black

(57) ABSTRACT

A power-actuated closure system is disclosed. The system includes a power-actuated closure panel having a leading edge. One or more non-contact optical sensing system(s) is/are affixed to the power-actuated closure panel. The sensing system is adapted to detect the presence of an obstruction in proximity to and in advance of the leading edge of the closure panel. The system also includes a control system that selectively controls the motion of the closure panel in response to signals received from the sensing system.

16 Claims, 3 Drawing Sheets

POWER-ACTUATED CLOSURE SYSTEM

TECHNICAL FIELD

The present disclosure relates generally to closure systems, and more specifically to power-actuated closure systems.

BACKGROUND

Many modern devices feature power-actuated closures, including power windows, power sliding doors, power garage doors, power lift gates, power sunroofs, and the like. Like manual closure systems, automatic closure systems may have an unintended closure or partial closure on an object. Some power-actuated closures include mechanisms which reverse or stop the motion of the closure upon contact with an object. However, the contact force between the object and the closure in these mechanisms may potentially be excessive before motion cessation or reversal, thereby mitigating or diminishing an intended benefit of the design.

As such, it would be desirable to provide a power-actuated closure system that is capable of detecting obstructions and substantially avoiding contact therewith.

SUMMARY

A power-actuated closure system includes a power-actuated closure panel having a leading edge. One or more non-contact optical sensing system(s) is/are affixed to the power-actuated closure panel. The sensing system is adapted to detect the presence of an obstruction in proximity to and in advance of the leading edge of the closure panel. The system also includes a control system that selectively controls the motion of the closure panel in response to signals received from the sensing system.

BRIEF DESCRIPTION OF THE DRAWINGS

Objects, features and advantages of embodiments of the present disclosure may become apparent by reference to the following detailed description and drawings, in which like reference numerals correspond to similar, though not necessarily identical components. For the sake of brevity, reference numerals having a previously described function may not necessarily be described in connection with other drawings in which they appear.

DETAILED DESCRIPTION OF THE EMBODIMENTS

The present inventors have fortuitously and unexpectedly discovered that embodiments of the present disclosure may reduce the potential for the unintended closure or partial closure on an object or body part. Embodiment(s) of the closure system advantageously include a non-contact sensing system that is capable of sensing the obstruction prior to the closure system coming in contact with the object causing the obstruction.

Figure 1:
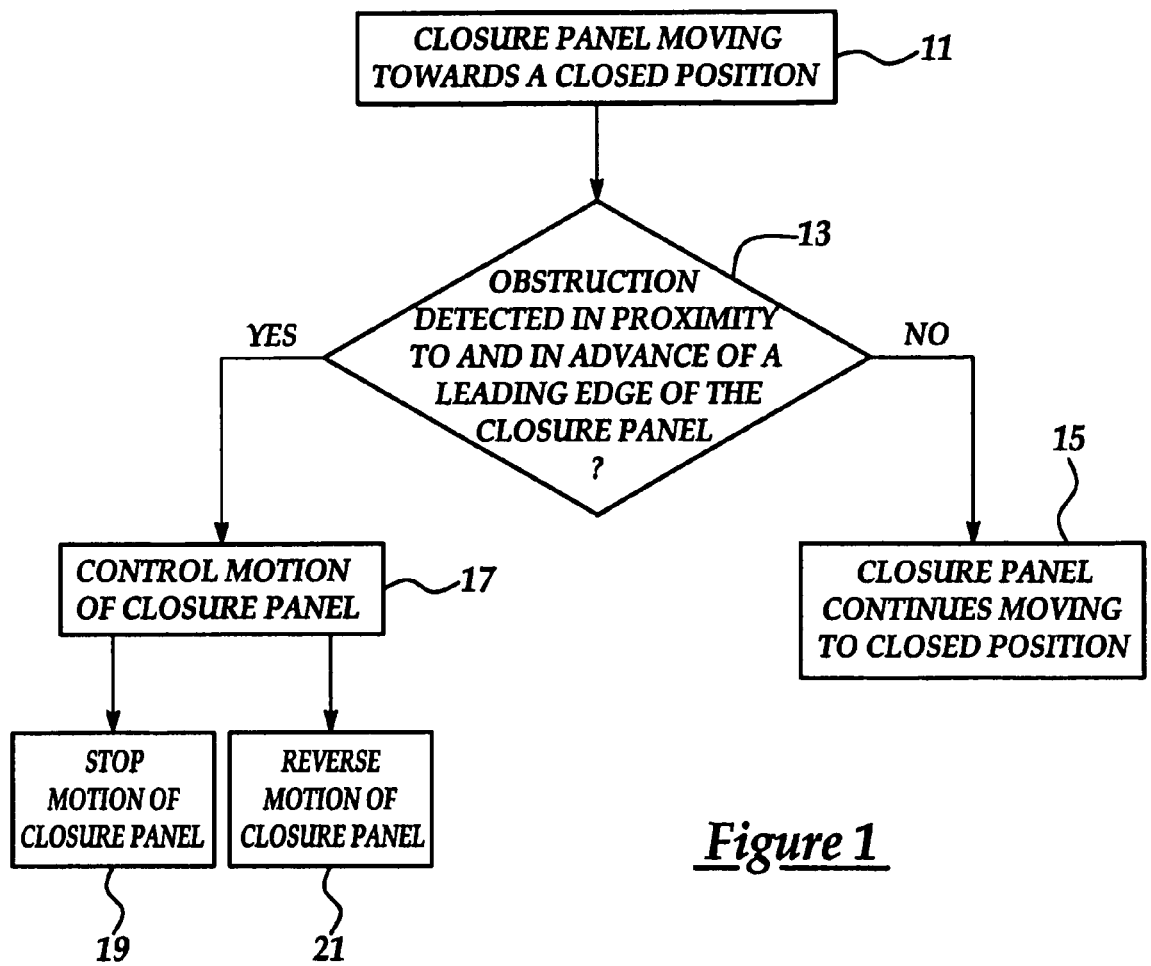
FIG. 1 is a flow diagram depicting an embodiment of a method of controlling a power-actuated closure system.

Referring now to FIG. 1, an embodiment of a method of controlling a closure system is depicted. Generally, a closure panel of the system is moving towards a closed position, as shown at reference numeral 11. A sensing device is capable of detecting an obstruction in proximity to, and in advance of a leading edge of the closure panel, generally depicted at reference numeral 13. If an obstruction is not detected, the closure panel continues moving to the closed position, as shown at reference numeral 15. However, if an obstruction is detected, the motion of the closure panel is controlled, as depicted at reference numeral 17. The motion of the closure panel may be stopped or it may be reversed, as shown respectively at reference numerals 19 and 21.

It is to be understood that embodiment(s) of the method will be referred to in more detail in reference to FIGS. 2 through 6.

Figure 2:
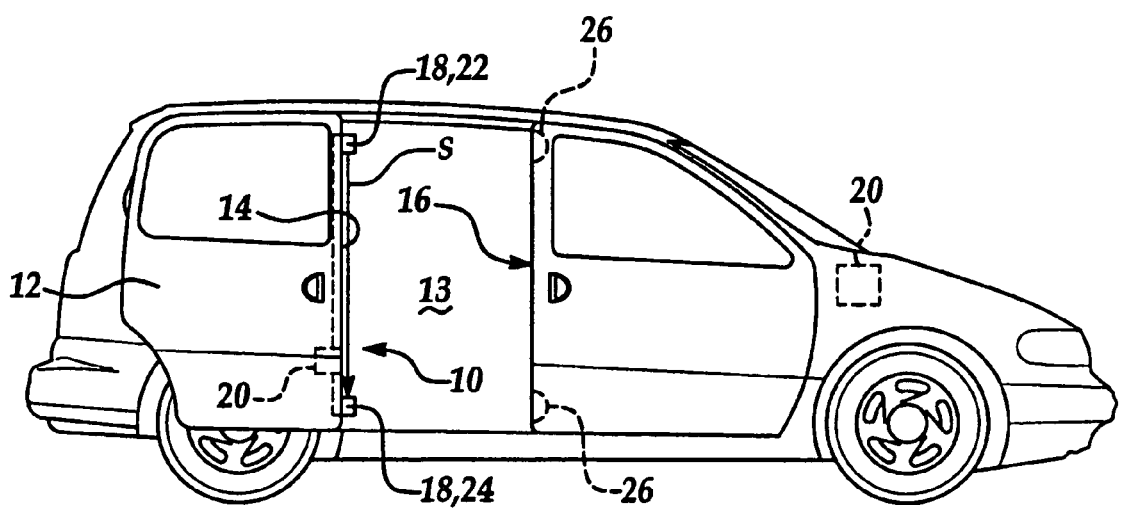
FIG. 2 is a schematic view of an embodiment of a power-actuated closure system incorporated in a sliding door of a motor vehicle.

Referring now to FIG. 2, an embodiment of the power-actuated closure, system 10 is depicted. The closure system 10 includes a power-actuated closure panel 12 that has a leading edge 14 during closure of the panel 12. It is to be understood that the leading edge 14 is adapted to contact a mating edge 16 when in a closed position.

The power-actuated closure panel 12 may be a window, a sliding door, a sunroof, a decklid, a lift gate, a trunk door, a garage door, and/or the like. In the non-limiting example depicted in FIG. 2, the closure panel 12 is the sliding door of a van.

When in an opened position, closure panel 12 is a spaced distance from the mating edge 16, such that an open space 13 is created between the panel 12 and the edge 16. The width of open space 13 may vary, depending, at least in part, on the position of the closure panel 12 in relation to the mating edge 16.

One or more non-contact optical sensing system(s) 18 is/are affixed by any suitable means to the power-actuated closure panel 12. In an embodiment, the sensing system 18 is permanently or removably mounted to panel 12 with screws, bolts, rivets, adhesives, and/or the like. Generally, the sensing system 18 is adapted to detect the presence of an obstruction in proximity to and in advance of the leading edge 14 of the closure panel 12.

In an embodiment, the sensing system 18 includes an optical transmitter 22 adapted to transmit an optical signal S in proximity to and in advance of the leading edge 14 of the closure panel 12. The sensing system 18 also includes an optical transducer 24 that is adapted to detect the optical signal S transmitted from the optical transmitter 22. In the embodiment shown in FIG. 2, the transmitter 22 and transducer 24 are affixed at opposed ends of the leading edge 14 such that the optical signal S is emitted along a path approximately coplanar with, and a predetermined spaced distance in advance of the leading edge 14, and substantially perpendicular to the closure panel's direction of travel. In the non-limitative example shown in FIG. 2, the closure panel 12 travels in a horizontal direction, and the optical signal S is transmitted in the vertical direction.

The term "in advance of" generally refers to the transmitted optical signal S extending into the open space 13 a fixed or variable distance ahead of, and substantially parallel to the leading edge 14 when the closure panel 12 is moving towards the closed position.

The optical signal S emitted by the transmitter 22 may be infrared radiation, ultraviolet radiation, visible radiation, and/or combinations thereof. Further, the optical signal S may be coded to substantially avoid interference from extraneous optical signals. It is to be understood that the optical signals S may be coded by any suitable means; however, in an embodiment, the signals are coded by at least one of frequency modulation, pulse width modulation, and combinations thereof.

A control system 20 is operatively connected such that it controls the motion of the closure panel 12. It is to be understood that the control system 20 is also configured to selectively control the motion of the closure panel 12 in response to signals received from the sensing system 18. As such, the control system 20 may receive input or signals from the sensing system 18, and send control signals to the closure panel 12. It is to be understood that the control system 20 is operatively connected to the sensing system 18 (e.g. both the transmitter 22 and the transducer 24). Further, the control system 20 may be housed in/on the closure panel 12, and/or in other areas of the vehicle (as shown in phantom in FIGS. 2 and 6). It is to be understood that these other areas of the vehicle may be any suitable areas for housing control system 20, including, but not limited to the engine compartment, under the package tray, under the seats, behind the dashboard, and/or in the headliner, and/or the like.

In an embodiment, an object/obstruction may enter the path of the closure panel 12 as it moves toward a closed position. Non-limiting examples of object(s)/obstruction(s) include human body parts, animal(s), inanimate objects (a non-limiting example of which includes a grocery bag), and the like.

As the object/obstruction comes in contact with the optical signal S emitted by the sensing system 18, the optical signal S is interrupted. It is to be understood that the sensing system 18 is capable of detecting such an interruption. In response to the optical signal S interruption, the sensing system 18 sends a signal to the control system 20 indicating the presence of the object/obstruction.

It is to be understood that if an interruption signal is imparted to the control system 20, the closure panel 12 is controlled such that it stops and/or has its motion reversed substantially prior to contacting the object/obstruction. In an embodiment, upon receiving an interruption signal, the control system 20 applies signals to drive circuitry that in turn may control power to the closure panel 12 to enable stopping the motion of the panel 12 or reversing the motion of the panel 12 for a predetermined distance. In an alternate embodiment, control system 20 applies signals to drive circuitry that in turn controls the mechanical motion of the panel 12. As such, actuators/motors associated with the drive circuitry may be stopped or reversed without interrupting power to them (e.g., by activating a brake or disengaging a clutch built into the actuator system). It is to be understood that any suitable means of stopping or reversing the motion of panel 12 is contemplated as being within the purview of the present disclosure, and the embodiment(s) disclosed herein are not intended to be limited to the examples given above.

FIG. 2 also depicts a recess 26 that is capable of housing the sensing system 18 when the closure panel 12 is in the closed position. The configuration and position of the recess 26 depends, at least in part, on the configuration and position of the sensing system 18 on the leading edge 14. In the non-limiting example shown in FIG. 2, the recess 26 is located within mating edge 16 and includes two sections, one for housing the transmitter 22 and one for housing the transducer 24. Further, in this example, the recess(es) 26 are located on an interior of the mating edge 16, into which the closure panel 12 slides when in the closed position. Generally, the recess(es) 26 are configured so that the sensing system 18 is not exposed when the closure panel 12 is in the closed position.

Generally, the closure panel 12 is designed to travel between an open position and a closed position. It is to be understood that the sensing system 18 may be configured to deactivate upon reaching a predetermined segment of the travel path, so that the panel 12 may enter the closed position. Without deactivation at a predetermined segment, the control system 20 may, in some instances, receive signals from sensing system 18 regarding, for example, the upcoming end of travel of closure panel 12 (the mating edge 16 when the panel 12 is in its normally closed position), and misinterpret those signals as an object/obstruction, thereby incorrectly commanding a stop or reversal of panel 12. This predetermined segment may be at any point along the travel path prior to, or immediately before the closed position. In a non-limiting example, the predetermined segment is directly adjacent the closed position.

Further, in an embodiment, the system 10 may optionally include an override system. It is to be understood that the override system may be operatively connected to and capable of shutting down the control system 20. The override system may be activated, for example, when a user wants to manually operate the closure panel 12. In an alternate embodiment, if self diagnostics indicate a sensing system 18 malfunction, the override system may be automatically activated. One non-limiting example of an application in which the system 10 may override itself automatically is with a power-actuated sunroof/panel 12 during precipitation. The falling rain/snow may break the optical signal S, preventing the sun-roof/panel 12 from closing. The system 10 may detect and ignore falling precipitation. In an embodiment, the control system 20 is operatively connected to a vehicle's rain sensor (that automatically adjusts the speed of windshield wipers) in order to detect the precipitation and fall rate thereof. The rain sensor uses an advanced optical sensing system, analog signal processing, and a control algorithm.

Figure 3:
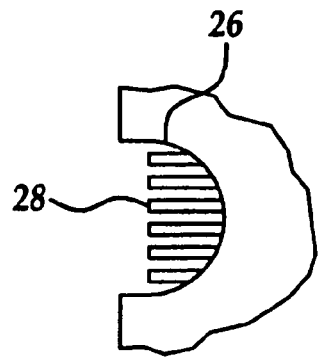
FIG. 3 is a enlarged, cutaway, semi-schematic view of an embodiment of a recess having a cleaning mechanism disposed therein.

Referring now to FIG. 3, the recess(es) 26 may include a cleaning mechanism 28 positioned therein. The cleaning mechanism 28 may include a plurality of bristles (as shown in FIG. 3), a cloth, a sponge, and/or the like. The cleaning mechanism 28 is adapted to clean/wipe the sensing system 18 when in contact therewith. Generally, the cleaning mechanism 28 assists in maintaining the cleanliness (e.g. removing dirt from the system 18) of the transmitter 22 and/or transducer 24 so that the elements substantially continuously function properly.

Figure 4:
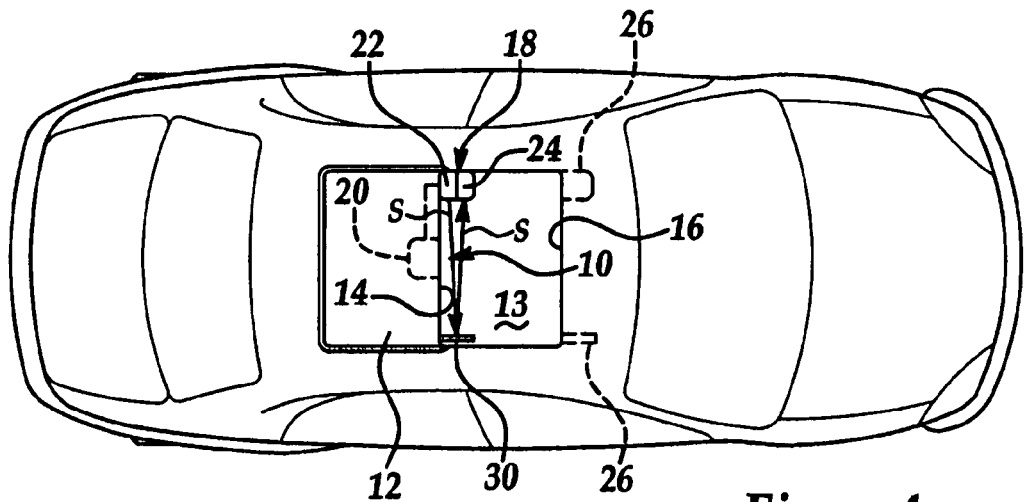
FIG. 4 is a top schematic view of an embodiment of a power-actuated closure system incorporated in a sunroof.

FIG. 4 depicts a top view of a sunroof incorporating the closure system 10. It is to be understood that this figure depicts an alternate embodiment of the sensing system 18 and control system 20. As shown, the transmitter 22 and the transducer 24 are adjacent each other within the sensing system 18. The transmitter 22 emits the optical signal S proximate to and in advance of the leading edge 14 of the panel 12. A reflector 30 is affixed to the leading edge 14 at an end opposed to where the transmitter 22 and transducer 24 are affixed. It is to be understood that any suitable reflector 30 may be used, and in an embodiment, the reflector 30 is a mirrored object. The reflector 30 receives the optical signal S from the transmitter 22 and reflects the signal S in the direction of the transducer 24, such that the transducer 24 ultimately detects the signal.

As depicted, the control system 20 of this embodiment may be operatively connected to the transmitter 22 and the transducer 24 via one connector (as opposed to the two connectors shown in FIG. 2), as the elements 22, 24 are adjacent each other.

It is to be understood that the portion of the recess 26 housing the transmitter 22 and transducer 24 is configured to house both elements 22, 24 when the panel 12 is in the closed position. Still further, the recess 26 in this embodiment includes a separate recess 26 for housing the reflector 30 of the sensing system 18. As depicted, the recesses 26 are located on an interior of the mating edge 16.

Figure 5:
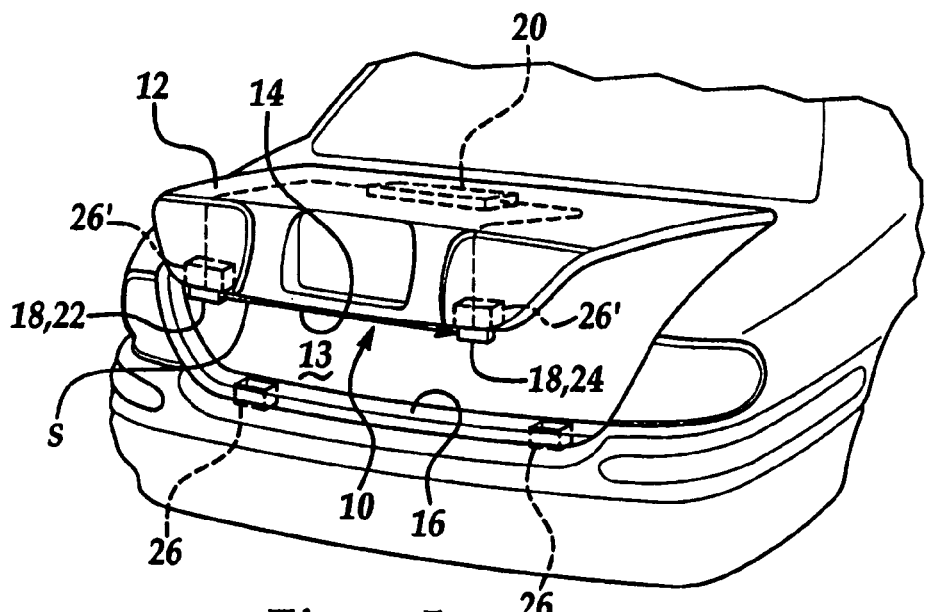
FIG. 5 is a cutaway perspective view of an embodiment of a power-actuated closure system incorporated in a decklid of a motor vehicle.
Figure 6:
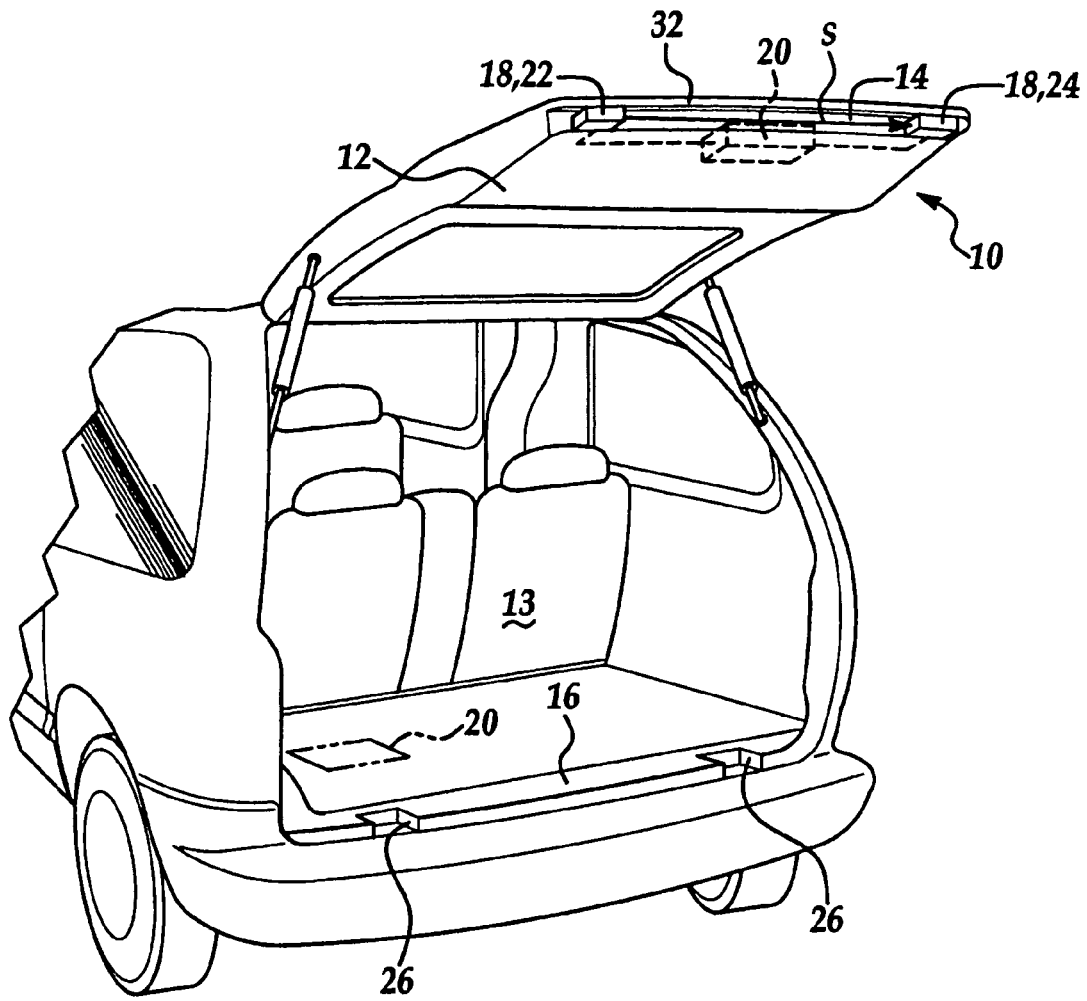
FIG. 6 is a cutaway perspective view of an embodiment of a power-actuated closure system incorporated in a lift gate.

Referring now to FIGS. 5 and 6 together, the closure system 10 is shown in both a decklid of a vehicle (FIG. 5) and a lift gate of a vehicle (FIG. 6). In both embodiments, the sensing system 18 is affixed to the leading edge 14 of the respective panels 12.

As depicted in the respective figures, the recess(es) 26 are located in appropriate areas of the mating edges 16 of the vehicles to house the sensing system 18 when the panels 12 are closed. FIG. 5 depicts groove-like recesses 26 that are aligned such that they house respective components of the sensing system 18 when the closure panel 12 is moved to the closed position. FIG. 6 depicts an alternate embodiment of the recesses 26, where a top and a front end are open so the sensing system 18 components 22, 24, and optionally 30 may slide into the recess 26 when the lift gate is closed. It is to be understood that the closure panel 12 (e.g. lift gate) may include a panel 32 that substantially hides the sensing system 18 and recesses 26 from view, as well as protecting these components from the surrounding environment when the panel 12 is closed.

Figure 7:
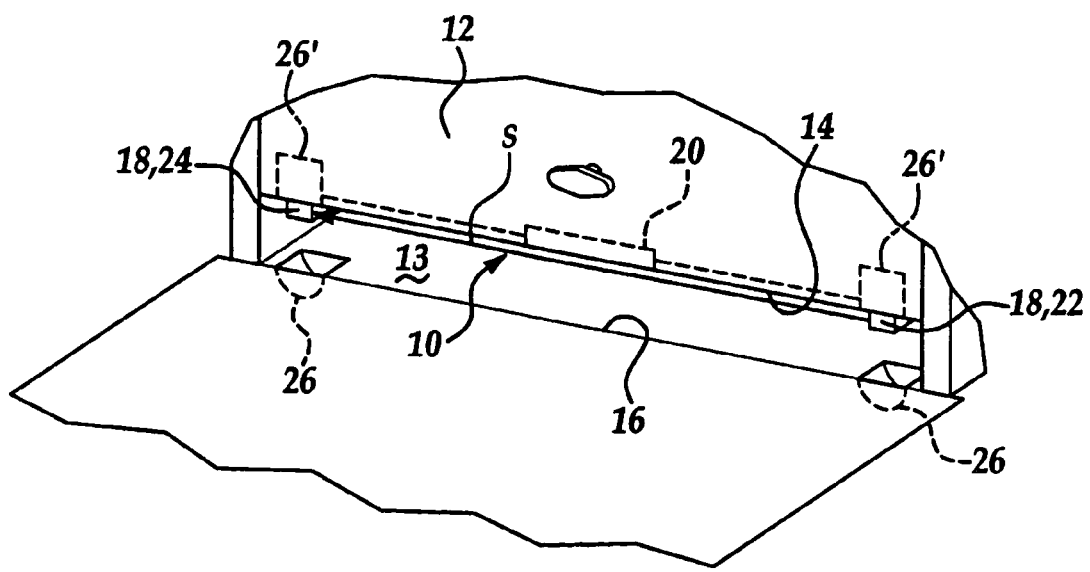
FIG. 7 is a cutaway perspective view of an embodiment of a power-actuated closure system incorporated in a garage door.

Referring now to FIG. 7, the closure system 10 is used in conjunction with a garage door. As previously described, the sensing system 18 is affixed to the leading edge 14 of the closure panel 12, and the control system 20 is operatively connected to the sensing system 18. In this embodiment, the recess 26 for the sensing system 18 may be located in the mating edge 16 (a non-limitative example of which is the ground), such that when the panel 12 is in the closed position, the sensing system 18 components 22, 24 (and optionally 30) are housed therein.

FIGS. 5 and 7 also depict an alternate embodiment of the recess 26, shown as recess 26'. In this alternate embodiment, the recess 26' is located on the interior of the closure panel 12. It is to be understood that upon deactivation of the sensing system 18 (previously described), the transmitter 22 and transducer 24 (and optionally the reflector 30) retract into the respective recesses 26'. The retraction of the sensing system components 22, 24 and optionally 30 (if used) may be controlled via the control system 20 that recognizes the deactivation of the sensing system 18. In a further embodiment, the components 22, 24 and optionally 30 are spring loaded such that they retract into recess(es) 26' upon normal closure of panel 12, and automatically move outwardly into an operative position upon opening of panel 12.

It is to be understood that in the embodiments and examples described herein, the closure system 10 (when incorporated into a motor vehicle) may operate while the vehicle is in motion and/or while the vehicle is stopped. The operation of the system 10 may be dependent upon, at least in part, the application with which it is being used. In a non-limitative example, if the closure system 10 is used with a sunroof or a window, the system 10 may be operated while the vehicle is both in motion and when stopped. In another non-limitative example, however, if the closure system 10 is used with a sliding door or a lift gate, it may be desirable to have the system 10 operable while the vehicle is stopped.

Still further, in any of the embodiments described herein, it is to be understood that both the transmitter 22 and transducer 24 are affixed to the leading edge 14 of the closure panel 12 such that the optical signal S is emitted proximate to and in advance of the leading edge 14 when the leading edge is moving towards the closed position.

The embodiment(s) disclosed herein include, but are not limited to the following advantages. Embodiment(s) of the closure system 10 advantageously include a non-contact sensing system 18 that is capable of sensing an object/obstruction prior to the closure system 10 coming in contact with the object causing the obstruction. Without being bound to any theory, it is believed that the system 10 may reduce unintended automatic closure or partial closure on an object or body part.

While several embodiments have been described in detail, it will be apparent to those skilled in the art that the disclosed embodiments may be modified. Therefore, the foregoing description is to be considered exemplary rather than limiting.

The invention claimed is:

1. A power-actuated closure system, comprising:
   a power-actuated closure panel having a leading edge during closure;
   at least one non-contact optical sensing system affixed to the power-actuated closure panel, the sensing system adapted to detect the presence of an obstruction in proximity to and in advance of the leading edge of the closure panel;
   a control system selectively controlling the motion of the closure panel in response to signals received from the sensing system;
   a recess adapted to house the at least one non-contact optical sensing system when the closure panel is in a closed position; and
   a cleaning mechanism positioned within the recess, the cleaning mechanism adapted to clean the at least one non-contact optical sensing system when in contact therewith.

2. The power-actuated closure system as defined in claim 1 wherein the at least one non-contact optical sensing system comprises:
   an optical transmitter adapted to transmit an optical signal, the signal in proximity to and in advance of the leading edge of the closure panel; and
   an optical transducer adapted to detect the optical signal.

3. The power-actuated closure system as defined in claim 2 wherein the optical signal is coded to avoid interference from extraneous optical signals.

4. The power-actuated closure system as defined in claim 2 wherein the optical signal is at least one of infrared radiation, ultraviolet radiation, and visible radiation.

5. The power-actuated closure system as defined in claim 1 wherein the closure panel comprises at least one of a window, a sliding door, a sunroof, a decklid, a lift gate, an accessory compartment door, and a garage door.

6. The power-actuated closure system as defined in claim 1 wherein the sensing system is deactivated upon the closure panel traveling to a predetermined segment.

7. The power-actuated closure system as defined in claim 1 wherein the power-actuated closure system operates at least one of while a vehicle in which the system is incorporated is parked and while the vehicle is moving.

8. The power-actuated closure system as defined in claim 1, further comprising an override system adapted to shut down the control system such that the closure panel is manually controllable.

9. The power-actuated closure system as defined in claim 1 wherein the motion is a closing motion, and wherein the detected presence of an obstruction interrupts the closing motion of the closure panel.

10. The power-actuated closure system as defined in claim 1 wherein the motion is a closing motion, and wherein the detected presence of an obstruction reverses for a predetermined distance the closing motion of the closure panel.

11. The power-actuated closure system as defined in claim 1 wherein the at least one non-contact optical sensing system comprises:
- an optical transmitter adapted to transmit an optical signal, the signal in proximity to and in advance of the leading edge of the closure panel;
- an optical transducer adapted to detect the optical signal, the optical transducer adjacent the optical transmitter; and
- a reflector adapted to reflect the optical signal from the optical transmitter to the optical transducer.

12. A method for controlling a power-actuated closure system, the method comprising:
- detecting, via at least one non-contact optical sensing system affixed to a power-actuated closure panel of the closure system, a presence of an obstruction in proximity to and in advance of a leading edge of the closure panel;
- cleaning, via a cleaning mechanism, the at least one non-contact optical sensing system; and
- controlling the motion of the closure panel in response to signals received from the sensing system.

13. The method as defined in claim 12 wherein the at least one non-contact optical sensing system comprises:
- an optical transmitter adapted to transmit an optical signal, the signal in proximity to and in advance of the leading edge of the closure panel; and
- an optical transducer adapted to detect the optical signal;
- and wherein detecting the presence of the obstruction is accomplished via an interruption in the optical signal.

14. The method as defined in claim 12 wherein the motion is a closing motion, and wherein detecting the presence of the obstruction interrupts the closing motion of the closure panel.

15. The method as defined in claim 12 wherein the motion is a closing motion, and wherein detecting the presence of the obstruction reverses for a predetermined distance the closing motion of the closure panel.

16. The method as defined in claim 12 wherein the cleaning mechanism is positioned within a recess adapted to house the at least one non-contact optical sensing system when the closure panel is in a closed position.

* * * * *